Patented Dec. 15, 1925.

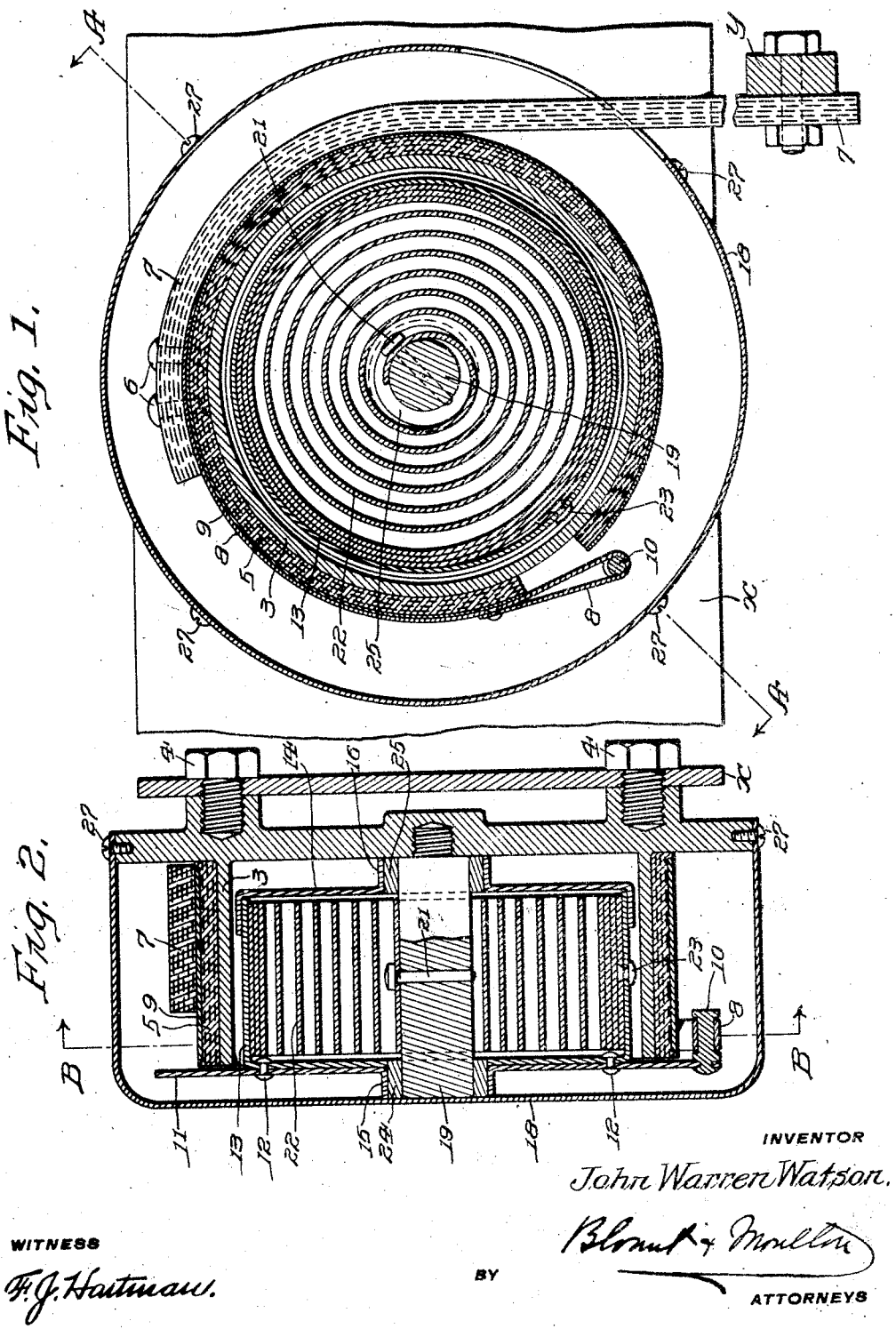

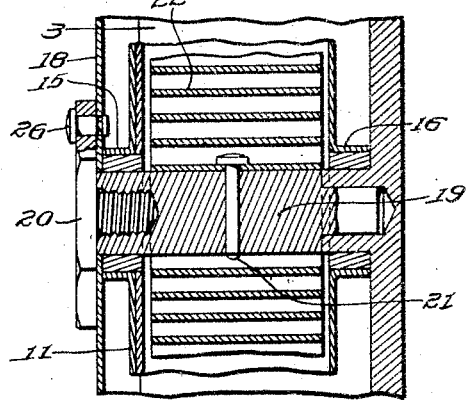
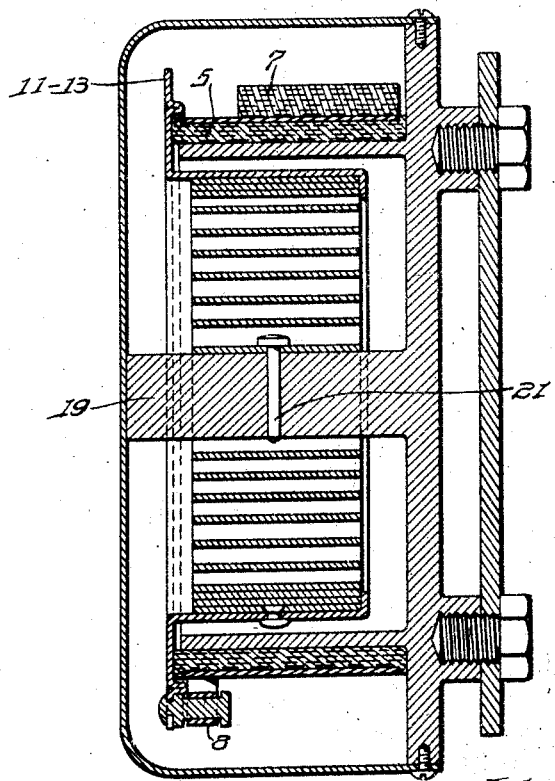

1,565,833

UNITED STATES PATENT OFFICE.

JOHN WARREN WATSON, OF WAYNE, PENNSYLVANIA.

MOTION-CONTROLLING MECHANISM.

Application filed August 7, 1919. Serial No. 315,794.

*To all whom it may concern:*

Be it known that I, JOHN WARREN WATSON, a citizen of the United States, and a resident of Wayne, in the county of Delaware and State of Pennsylvania, have invented certain new and useful Improvements in Motion-Controlling Mechanism, of which the following is a specification, reference being had to the accompanying drawings.

This invention relates to a novel combination for controlling, regulating or checking relative movement in one direction between any two elements, and in particular relates to that class of mechanism intended to check the recoil or rebound of vehicle body supporting springs as they react following their compression. If desired, my invention may be employed in connection with any other relatively movable elements for the purpose of retarding or checking their relative movement in one direction without retarding or checking their relative movement in another direction.

A particular object of my invention is to provide a friction motion controlling mechanism, which, under all normal conditions of operation, and within the total working range of the mechanism, cannot be caused, or cannot tend, to jam or become locked against operation.

To accomplish the above, in the embodiment shown and described herewith, I include a drum member, a friction member partially surrounding said drum member, and a power transmitting member (in this instance, strap 7) attached to the friction member at such point thereon as to provide for the device a sufficient working range without necessitating that the strap be wound upon the friction member beyond the gap in said friction member. Thus not bridging this gap, the device cannot, under normal conditions of operation, become locked against operation.

It is a further object of this invention to reduce the functions of certain members of the mechanism to a minimum number. For example, in the embodiments shown, the functions of the friction member 5 are reduced to merely those of generating friction and resisting the wear resulting from this friction. Likewise, in the embodiments shown, the function of the power transmitting member 7 is reduced merely to that of transmitting power. By thus limiting the major functions of these members, each of them may be so designed, so built, and made of such material as not to be compromised in their abilities to properly do their respective work and to stand up and give long service under such work.

It is a further object of my invention to provide, a mechanism, for the purpose as stated, including a drum member, adapted to be secured to one of two relatively movable elements, a friction member adapted to be secured to the other relatively movable element, a spring connecting said drum and said friction member, and means connected to said spring, and so associated with other parts of the mechanism as to render said spring subject only to direct torsional stresses. In the embodiment shown, the spring member 22 is itself relieved of all side stresses or stresses other than direct torsional stresses, which might be set up in the transmission of its power, by means of spring box 13, spring box cover 14 and the bearings 15 and 16.

It is a further object of this invention to provide a mechanism in which the main spring element is housed or boxed or in some other way maintained within predetermined limits, so that, regardless of the extent to which this spring may be wound up or unwound it is incapable of exceeding these limits and hence is incapable of rubbing or binding or in any other way coming in moving contact with other relatively movable parts of the mechanism. The purpose of thus providing against any such contact is to insure, at all times, and for any adjustment of the mechanism, smooth and unhampered operation and long service. Another purpose of thus housing, or otherwise maintaining within limits this necessarily-heavy main spring, is to facilitate in assembling and disassembling the mechanism.

Various combinations of elements and different means could be readily employed to obtain the results secured by the mechanism disclosed without departing from the spirit and scope of this invention, the illustrations herewith being merely by way of example.

One embodiment of this invention is shown by the accompanying drawings in which Figure 1 is a cross section, partly in elevation, on line B—B Figure 2. Figure 2 is a cross section, partly in elevation, on line A—A Figure 1. Figure 3 is a fragmentary cross section on line A—A Figure 1, but showing a modification providing for external adjusting means. Figure 4 is the same as Figure 2 except for showing a modification in the means for maintaining the spring within limits and for limiting the operative stresses on the spring to direct annular stresses. In all four figures, like numbers refer to like parts.

Referring to Figures 1 and 2, X and Y represent relatively movable elements whose motion, one relative to the other, it is desired to check, regulate or control. These elements are illustrated merely diagrammatically for the purpose of indicating that this invention may be applied and utilized in connection with any elements which move, one relative to the other, and whose movement it is desired to effectively control.

A drum member 3 is carried by the element X and is secured thereto by any suitable means such as by cap screws 4. Securely fixed to the drum member 3, by means of a right hand or left hand thread, depending upon the rotation of other of the members, is a member 19. Secured to member 19, as for example by the pin 21, is a spring 22. The other end of spring 22 is secured to a spring box 13 by any suitable means such as by a stud 23. Spring box 13 is free to rotate on member 19 as is also the spring box cover 14 free to rotate on member 19. If desired, for the purpose of minimizing wear between member 19, and members 13 and 14, bushings 24 and 25, of any suitable material, may be interposed as illustrated. Secured to member 13, as for example, by rivets 12, is a disk 11. By means of a stud 10, which is secured to disk 11, and by means of the looped band 8 and rivets 6, the disk member 11 is secured to a friction member 5 which latter member is in the form of a split ring and contacts with drum member 3. Friction member 5 may be provided with a backing 9, as shown, if desired, for the purpose of additional strength or for the purpose of flexibly maintaining any given curvature to member 5. In addition to the above, this backing 9 possesses the function of reducing the friction between the friction member and the power transmitting member due to the alternate stretching and shrinking of the power transmitting member as the load thereon is alternately applied and released. Also attached to member 5, as for example by rivets 6, is a power transmitting member 7 which is secured to element Y. Cover member 18 is secured to drum member 3 by any suitable means, such as, for example, by screws 27. The drum member 3 and the friction member 5 constitute one type of frictionally engaging members, although it is apparent that these members may be made in any other shape than that of a drum and split ring and relatively associated in various other ways than that just described and still incorporate therein the essentials of my invention.

As attached, in the present instance, to elements X and Y, the invention is operative to retard or control the relative separation of these elements without retarding their relative approach. The operation of the device, as shown in the present instance, may be described as follows:—

Spring 22 which, in assembling, is wound up to any desired tension, is constantly tending to revolve spring box 13 and disk 11 with relation to member 19, and, also therefore, with relation to drum 3. And, by means of stud 10, band 8 and rivets 6, spring 22 is hence also constantly tending to rotate friction member 5 around drum number 3. This tendency, however, of spring member 22 to thus rotate member 5 with relation to drum 3, is resisted by means of the power transmitting member 7 which is secured to friction member 5 and also to element Y. When, however, elements X and Y are caused to approach each other, this tendency of spring 22, to rotate these parts as above, becomes an action and the parts are thus rotated to whatever extent is permitted by the extent of approach of elements X and Y. And as these members are thus caused to relatively rotate, it will be seen that power transmitting member 7 is wound upon member 5. Member 7, however, is attached to member 5 at such a point thereon as to prevent member 7 from being wound upon member 5 beyond the gap in member 5 even when the elements X and Y have approached each other to their limit.

When elements X and Y are caused to separate, their separation is resisted by the invention, as follows:—

When X and Y thus separate, power transmitting member 7 is made to pull on member 5 and cause it to rotate with relation to drum 3. This rotation of member 5, with relation to drum 3, however, is resisted by the friction between these two latter members, which friction is augmented by the resistance of spring 22 which, as shown above, is pulling, in the reverse direction, on member 5 through the media of box 13, disk 11, stud 10 and band 8. While it is true that this separation may cause the winding-up of the spring possibly to the extent of three-quarters of a turn, the increasing resistance produced by this winding-up action is negligible as compared with the force required to overcome the friction between the drum and the parts co-acting therewith. And the resistance produced by this friction naturally decreases as the area of the curved friction shoe forcibly pressed against the drum by the tension of strap 7, approaches a minimum. It must be remembered however that simply to decrease the area between co-acting friction members does not necessarily decrease the force required to overcome the friction between them. One method of decreasing the force required to overcome friction between two members is to reduce the pressure between them, and in the particular embodiment of my invention illustrated herewith this is accomplished, as elements X and Y separate, by decreasing the arc of wrap of member 7 around the friction members. While I have here illustrated and in detail described one method of decreasing the resistance to the separation of elements X and Y, I do not wish thereby to limit myself to this particular form, arrangement and association of parts for bringing about this result, but wish to avail myself of such variations and modifications as come within the scope of the appended claims. The amount of frictional resistance may be altered by readjusting the tension of spring 22 as any such re-adjustment will cause an increase or decrease in the pressure between the friction members due to the increase or decrease in the pull required on member 7 to relatively move the members.

If desired, some form of external spring-adjusting means may be provided, as, for example, some such construction as shown in Figure 3, in which member 19, instead of being threaded and thereby held rigid with relation to drum 3, is rotatably mounted therewith. At its other end, member 19 is rotatably supported by an aperture in cover plate 18. screwed into this end of member 19, or otherwise suitably fixed thereto, is a member or head 20 which is formed to accommodate a wrench and thus provides a means for winding the member 19 and thereby adjusting the tension of spring 22. By means of registering holes through head 20 and cover plate 18 and by means of pin 26, any desired adjustment of spring 22 is maintained.

In Figures 1, 2 and 3, it will be noted that spring 22 is subjected to no stresses other than direct annular stresses. This feature is of extreme importance, as concerns the commercial value of the device, because side stresses or other stresses which might be set up in a spring, for the purpose herewith, would cause the spring or its attaching devices to fatigue and break in a comparatively short time. In the embodiment shown in the above figures, all side stresses resulting in transmitting the power of the spring to the member 8 and in turn to member 5 and 7, are absorbed by bearings 15 and 16. It will also be noted that regardless of how tightly or how loosely spring 22 may be wound it cannot come in rubbing contact with drum member 3 or any other part of the mechanism. This feature is also of extreme importance not only from the point of view of long life, but also from the view point of smooth, unhampered and hence satisfactory operation of the mechanism.

In Figure 4 is shown a modified means for maintaining the spring within limits and also means for relieving the spring of any and all stresses other than direct torsional stresses. In this modification shown in Figure 4, any side stresses or other stresses resulting in transmitting the power of the spring to the member 8 and in turn to members 5 and 7 will be absorbed by causing member 11—13 to press against the unyielding edge of friction member 5, the spring being so positioned on member 19 by means of pin 21 as to hold member 11—13 snugly against the entire edge of member 5. In this modification, member 11—13 and member 5 take the place of spring box 13, cover 14 and bearings 15 and 16 as shown in the embodiment illustrated in Figures 1, 2 and 3.

It will be noted that power transmitting member 7 is attached to friction member 5 at such a point thereon as to provide ample working range for the mechanism without necessitating that member 7 be wound on friction member 5 beyond the gap in this latter member.

It will further be noted that member 5 has no major functions other than generating friction and resisting the wear resulting from this friction, and that member 7 has no major function other than the transmission of power.

While I have illustrated and described a preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim and desire to protect by Letters Patent of the United States is:

1. In mechanism adapted for use in connection with two relatively movable elements for checking their relative motion in one direction, a drum adapted to be secured to one of said elements, a friction member, in the form of a split ring, in contact with said drum, a power transmitting member secured to said friction member, and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member.

2. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member.

3. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, and means to maintain said spring within pre-determined limits regardless of the extent to which said spring may be wound up or unwound.

4. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, and means to maintain an end portion of said spring out of rubbing contact with other parts of the mechanism notwithstanding the extent to which said spring may be adjusted.

5. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, the form of said friction member being such as to maintain substantially constant the area of contact between itself and said drum throughout the working range of the mechanism.

6. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, a member lying between said friction member and said power-transmitting member, and means for so transmitting the power of said spring as to subject said spring to no lateral twisting stresses.

7. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, all being so combined as to cause said friction member to slide freely on said drum when said elements approach each other and cause a braking action upon the separation of said elements, which braking action, by reason of a changing relation between the power-transmitting member and the friction member, decreases as said elements separate.

8. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, all being so combined as to cause said friction member to slide freely on said drum when said elements approach each other and cause a braking action upon the separation of said elements, which braking action, by reason of a changing relation between the power-transmitting member and the friction member, decreases as said elements separate, and means to maintain said spring within predetermined limits regardless of the extent to which said spring may be wound or unwound.

9. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, all being so combined as to cause said friction member to slide freely on said drum when said elements approach each other and cause a braking action upon the separation of said elements, which braking action, by reason of a changing relation between the power-transmitting member and the friction member, decreases as said elements separate, the combination of parts being such as to maintain, throughout the working range of the mechanism, the same surface portion of the friction member in contact with the drum.

10. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, all being so combined as to cause said friction member to slide freely on said drum when said elements approach each other and cause a braking action upon the separation of said elements, which braking action, by reason of a changing relation between the power-transmitting member and the friction member, decreases as said elements separate, a member lying between said friction member and said power-transmitting member and means for so transmitting the power of said spring as to subject said spring to no lateral twisting stresses.

11. In mechanism for controlling motion between relatively movable elements, the combination of a drum adapted to be secured to one of said elements, a friction member in contact with said drum, a spring connecting said drum and said friction member, a power transmitting member mechanically attached to said friction member and adapted to be connected to said other element and a member lying between said friction member and said power-transmitting member, all being so combined as to cause a decrease in the contact area between the power transmitting member and the last mentioned member as the elements move in one direction.

12. In mechanism adapted to control motion between two relatively movable elements, a drum adapted to be secured to one of said elements, a friction member in contact with said drum, a spring connecting said drum and said friction member for relatively moving them, means supported by said spring and said friction member for maintaining an end portion of said spring out of rubbing contact with parts of the mechanism which are movable with relation to said spring and said friction member while the mechanism is in operation, and a power-transmitting member attached to said friction member and adapted to be attached to said other element and being so associated with said friction member as to decrease the frictional resistance between said friction member and said drum as the elements relatively move in one direction.

13. In mechanism adapted to control motion between two relatively movable elements, a drum adapted to be secured to one of said elements, a friction member in contact with said drum, a spring connecting said drum and said friction member for relatively moving them, means supported by said spring and said friction member for maintaining an end portion of said spring out of rubbing contact with parts of the mechanism which are movable with relation to said spring and said friction member while the mechanism is in operation, said means also being out of rubbing contact with said parts during said operation, and a power-transmitting member attached to said friction member and adapted to be attached to said other element, the parts being so arranged as to cause a braking action upon the separation of said elements, which braking action decreases as said elements separate.

14. In mechanism for controlling motion between two relatively movable elements, a drum adapted to be secured to one of said elements, a friction member in contact with said drum, a spring connecting said drum and said friction member, a flexible power transmitting member mechanically attached to said friction member and adapted to be connected to said other element and a member lying between said friction member and said power-transmitting member, all being so combined as to cause said friction member to slide freely on said drum when said elements approach each other and cause a braking action upon the separation of said elements, which braking action, by reason of a changing relation between the power-transmitting member and the friction member, decreases as said elements separate.

15. In mechanism adapted for use in connection with two relatively movable elements for controlling their relative motion in one direction, a drum adapted to be secured to one of said elements, a fourth friction member in the form of a split ring in contact with said drum, a flexible power-transmitting member secured to said friction member and adapted to be secured to said fourth other element, a spring connecting said drum and said friction member and tending to rotate said friction member with relation to said drum and also tending to wind said power-transmitting member upon said friction member, and means so supported by said spring and said friction member as to maintain an end portion of said spring, and also said means, out of rubbing contact with parts of the mechanism which are movable with relation to said spring end while the mechanism is in operation, said power-transmitting member being attached to said friction member at a point thereon which makes it possible for the device to operate throughout its working range without necessitating that said power-transmitting member be wound upon said friction member beyond the gap in said friction member.

16. In mechanism for controlling motion between relatively movable elements, a drum adapted to be secured to one of said elements, a friction member in contact with said drum and adapted to be secured to said other element, a spring connecting said drum and said friction member, and means in contact only with said spring and said friction member for maintaining said spring within pre-determined limits regardless of the extent to which said spring may be wound up or unwound.

17. In mechanism for controlling motion between relatively movable elements, a drum adapted to be secured to one of said elements, a friction member in contact with said drum and adapted to be secured to said other element, a spring connecting said drum and said friction member, and means, structurally independent of the drum, comprising a cylindrically formed member with an outwardly extending flange, for maintaining said spring within pre-determined limits, regardless of the extent to which said spring may be wound up or unwound.

18. In mechanism adapted for use in connection with two relatively movable elements for checking their relative motion in one direction, a drum adapted to be secured to one of said elements, a friction member, in the form of a split ring, in contact with said drum, a power transmitting member secured to said friction member and adapted to be secured to said other element, a friction reducing member interposed between said friction member and said power transmitting member, a spring connected to said drum and to said friction member and tending to rotate said friction member with relation to said drum and also tending to wind said power transmitting member around said friction member, said power transmitting member being attached to said friction member at a point thereon which makes it possible for the device to operate throughout its working range without necessitating that said power transmitting member be wound around said friction member beyond the gap in said friction member.

19. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, means for reducing friction between said friction member and said power transmitting member, a spring connected to said drum and to said friction member and tending to rotate said friction member with relation to said drum and also tending to wind said power transmitting member around said friction member, said power transmitting member being attached to said friction member at a point thereon which makes it possible for the device to operate throughout its working range without necessitating that said power transmitting member be wound around said friction member beyond the gap in said friction member.

20. In mechanism for checking motion between relatively movable elements, the combination of a drum adapted to be attached to one of said elements, a friction member in contact with said drum, reinforcing means for said friction member so constructed and arranged as to hold the latter substantially in contact with said drum over the entire area of said friction member, a spring connecting said drum and said friction member, and a member in circumferential relation with said friction member and secured thereto and adapted to be attached to said other element.

21. In mechanism for checking motion between relatively movable elements, the combination of a drum adapted to be attached to one of said elements, a friction member in contact with said drum, reinforcing means for said friction member so constructed and arranged as to hold the latter substantially in contact with said drum over the entire area of said friction member even after wear on said friction member has occurred, a spring connecting said drum and said friction member, and a member in circumferential relation with said friction member and secured thereto and adapted to be attached to said other element.

22. In mechanism for checking motion between relatively movable elements, the combination of a drum adapted to be attached to one of said elements, a friction member in contact with said drum, reinforcing means for said friction member so constructed and arranged as to hold the latter in a predetermined form, a spring connecting said drum and said friction member, and a member in circumferential relation with said friction member and secured thereto and adapted to be attached to said other element.

23. In mechanism for checking motion between relatively movable elements, the combination of a drum adapted to be attached to one of said elements, a friction member in contact with said drum, reinforcing means for said friction member so constructed and arranged as to hold the latter in a predetermined form even after wear on said friction member has occurred, a spring connecting said drum and said friction member, and a member in circumferential relation with said friction member and secured thereto and adapted to be attached to said other element.

24. In mechanism for controlling motion between relatively movable elements, a drum adapted to be secured to one of said elements, a friction member in contact with said drum and adapted to be connected to said other element, a spring connecting said drum and said friction member, and means, supported by said friction member, to maintain the outer end of said spring out of rubbing contact with said drum.

25. In mechanism for controlling motion between relatively movable elements, a drum adapted to be secured to one of said elements, a friction member in contact with said drum and adapted to be connected to said other element, and a spring connecting said drum and said friction member, the outer end of said spring being so supported by said friction member as to maintain said spring-end out of contact with said drum.

26. In mechanism for controlling motion between two relatively movable elements, the combination of a drum member adapted to be secured to one of said elements, a friction member in contact with said drum member and adapted to be connected to said other element, a spring connecting said drum member and said friction member for relatively moving them and means so supported by said spring and said friction member as to maintain an end portion of said spring, and also said means, out of rubbing contact with parts of the mechanism which are movable with relation to said spring end while the mechanism is in operation.

27. In mechanism for controlling motion between relatively movable elements, the combination of a drum member adapted to be secured to one of said elements, a friction member in contact with said drum member, a spring connected to said drum member and to said friction member and tending to relatively move said members, a flexible member mechanically attached to said friction member and adapted to be secured to said other element, all being so combined as to cause a decrease in the pressure area between said flexible member and said friction member as the elements move in one direction, means to maintain said spring within pre-determined limits regardless of the extent to which said spring may be wound up or unwound and a support to maintain said means away from contact with the drum portion of said drum member.

28. In mechanism for controlling motion between relatively movable elements, a drum adapted to be secured to one of said elements, a flexible member, a friction member in contact with said drum and adapted to be secured to said other element by said flexible member, a spring connected to said drum and to said friction member, and means in contact only with said spring and said friction member and their appurtenances for maintaining the outer end of said spring away from contact with said drum.

29. In mechanism for controlling motion between two relatively movable elements, a member of substantially cylindrical form adapted to be secured to one of said elements, a member movable around said first mentioned member and adapted to be connected to said other element, a spring connecting said members and tending to cause them to move with relation to one another and means, in contact only with said spring and one of said first-mentioned members and their appurtenances, for maintaining an end portion of said spring out of contact with the other of said first-mentioned members during the operation of the mechanism.

30. In mechanism for controlling relative movement between two elements, the combination of two frictionally opposed members, a spring connecting said members and means comprising a circumferential member independent of said frictionally opposed members for holding said spring partially compressed.

31. In mechanism adapted for use in connection with two relatively movable elements for checking their relative motion in one direction, a drum adapted to be secured to one of said elements, a friction member, in the form of a split ring, a power transmitting member secured to said friction member and adapted to be secured to said other element, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, and means of substantially cylindrical form to maintain an end portion of said spring out of rubbing contact with other parts of the mechanism.

32. In mechanism for controlling motion between relatively movable elements, the combination of a drum adapted to be secured to one of said elements, a friction member in contact with said drum, a spring connecting said drum and said friction member, a power transmitting member mechanically attached to said friction member and adapted to be connected to said other element, with friction reducing means between the friction member and the power transmitting member all being so combined as to cause said friction member to slide freely on said drum when said elements approach each other and cause a braking action upon the separation of said elements, which braking action, by reason of a changing relation between the power-transmitting member and the friction member, decreases as said elements separate.

33. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, with friction reducing means between the friction member and the power transmitting member all being so combined as to cause said friction member to slide freely on said drum when said elements approach each other and cause a braking action upon the separation of said elements, which braking action decreases as said elements separate, and means to maintain said spring within pre-determined limits regardless of the extent to which said spring may be wound or unwound.

34. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, with friction reducing means between the friction member and the power transmitting member all being so combined as to cause said friction member to slide freely on said drum when said elements approach each other and cause a braking action upon the separation of said elements, which braking action, by reason of a changing relation between the power-transmitting member and the friction member, decreases as said elements separate, and means for so transmitting the power of said spring as to subject said spring to no lateral twisting stresses.

35. In mechanism for controlling motion between relatively movable elements, the combination of a drum adapted to be secured to one of said elements, a friction member in contact with said drum, a spring connecting said drum and said friction member, and a power transmitting member mechanically attached to said friction member and adapted to be connected to said other element, with friction reducing means between the friction member and the power transmitting member all being so combined as to cause a decrease in the contact area between the power transmitting member and the friction reducing means as the elements move in one direction.

36. In mechanism adapted to control motion between two relatively movable elements, a drum adapted to be secured to one of said elements, a friction member in contact with only a portion of the surface of said drum, a spring connecting said drum and said friction member for relatively moving them, and a power transmitting member attached to said friction member and adapted to be attached to said other element, and being so associated with said friction member as to decrease the frictional resistance between said friction member and said drum as the elements relatively move in one direction, with friction reducing means between the friction member and the power transmitting member.

37. In mechanism for controlling motion between two relatively movable elements, a drum adapted to be secured to one of said elements, a friction member in contact with said drum, a spring connecting said drum and said friction member, and a flexible power transmitting member mechanically attached to said friction member and adapted to be connected to said other element, with friction reducing means between the friction member and the power transmitting member all being so combined as to cause said friction member to slide freely on said drum when said elements approach each other and cause a braking action upon the separation of said elements, which braking action, by reason of a changing relation between the power-transmitting member and the friction member, decreases as said elements separate.

38. In mechanism adapted for use in connection with two relatively movable elements for checking their relative motion in one direction, a drum adapted to be secured to one of said elements, a friction member, in the form of a split ring, in contact with said drum, a flexible power transmitting member secured to said friction member and adapted to be secured to said other element, a spring connected to said drum and to said friction member and tending to rotate said friction member with relation to said drum and also tending to wind said power transmitting member upon said friction member, with friction reducing means between the friction member and the power transmitting member said power transmitting member being attached to said friction member at a point thereon which makes it possible for the device to operate throughout its working range without necessitating that said power transmitting member be wound upon said friction member beyond the gap in said friction member.

39. In mechanism for controlling motion between relatively movable elements, a drum adapted to be secured to one of said elements, a friction member in contact with said drum and adapted to be secured to said other element, a spring connecting said drum and said friction member, and means in contact only with said spring and said friction member for maintaining said spring within predetermined limits regardless of the extent to which said spring may be wound up or unwound, with friction reducing means between the friction member and the power transmitting member.

40. In mechanism adapted for use in connection with two relatively movable elements for checking their relative motion in one direction, a drum adapted to be secured to one of said elements, a friction member, in the form of a split ring, in contact with said drum, a power transmitting member secured to said friction member and adapted to be secured to said other element, a member lying between said friction member and said power transmitting member, a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, and the parts all being so combined as to cause said friction member to slide freely on said drum when said elements approach each other and cause a braking action which decreases as said elements separate.

41. In mechanism adapted for use in connection with two relatively movable elements for checking their relative motion in one direction, a drum adapted to be secured to one of said elements, a friction member, in the form of a split ring, passing around only a portion of said drum, a power transmitting member secured to said friction member and adapted to be secured to said other element, a member lying between said friction member and said power-transmitting member a spring connected to said drum and to said friction member and tending to rotate said friction member with relation to said drum and also tending to wind said power transmitting member upon said friction member, said power transmitting member being attached to said friction member at a point thereon which makes it possible for the device to operate throughout its working range without necessitating that said power transmitting member be wound upon said friction member beyond the gap in said friction member, and the parts all being so combined as to cause said friction member to slide freely on said drum when said elements approach each other and cause a braking action which decreases as said elements separate.

42. In mechanism for controlling motion between relatively movable elements, the combination of a drum member adapted to be secured to one of said elements, a friction member in contact with said drum member, a spring connected to said drum member and to said friction member and tending to relatively move said members, a flexible member mechanically attached to said friction member and adapted to be secured to said other element, and a friction reducing means between the flexible member and said friction member all being so combined as to cause a decrease in the pressure area between said flexible member and said friction member as the elements move in one direction, means for maintaining the outer end of said spring away from contact with the drum portion of said drum member, and a support for said means to maintain said means away from contact with the drum portion of said drum member.

43. In mechanism for controlling motion between relatively movable elements, the combination of a drum member adapted to be secured to one of said elements, a friction member in contact with said drum member, a spring connected to said drum member and to said friction member and tending to relatively move said members, a flexible member mechanically attached to said friction member and adapted to be secured to said other element, and a friction reducing member between said flexible member and the friction member all being so combined as to cause a decrease in the pressure area between said flexible member and said friction member as the elements move in one direction, means to maintain said spring within pre-determined limits regardless of the extent to which said spring may be wound up or unwound, and a support to maintain said means away from contact with the drum portion of said drum member.

44. In mechanism for controlling motion between relatively movable elements, a drum adapted to be secured to one of said elements, a flexible member, a friction member in contact with said drum and adapted to be secured to said other element by said flexible member, friction reducing means between said flexible member and said friction member, a spring connected to said drum and to said friction member, and means in contact only with said spring and said friction member and their appurtenances for maintaining the outer end of said spring away from contact with said drum.

45. In mechanism for controlling relative movement between two elements, the combination of two relatively movable members, a friction member between said members, a spring and a flexible member, said spring being connected to each of said first-mentioned members and tending to move one of them, and also said flexible member, with relation to the other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively move said two first-mentioned members as said members are relatively moved by said flexible member.

46. In mechanism for controlling relative movement between two elements, the combination of two relatively movable members, a curved friction member between said members, a spring and a flexible member, said spring being connected to each of said first-mentioned members and tending to move one of them, and also said flexible member, with relation to the other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively move said two first-mentioned members as said members are relatively moved by said flexible member.

47. In mechanism for controlling the reaction of a vehicle spring, the combination of two relatively revolvable members, a friction member between said members, a spring and a flexible member, said spring being connected to each of said first-mentioned members and tending to revolve one of them with relation to the other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively revolve said two first-mentioned members as they are relatively revolved by said flexible member.

48. In mechanism for controlling relative movement between two elements, the combination of two relatively movable members, a friction member between said members and attached to one of them, a spring and a flexible member, said spring being connected to each of said first-mentioned members and tending to move one of them with relation to the other as said elements move toward each other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively move said two first-mentioned members as said members are relatively moved by said flexible member.

49. In mechanism for controlling relative movement between two elements, the combination of two relatively movable members, a curved friction member between said members and attached to one of them, a spring and a flexible member, said spring being connected to each of said first-mentioned members and tending to move one of them with relation to the other as said elements move toward each other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively move said two first-mentioned members as said members are relatively moved by said flexible member.

50. In mechanism for controlling the reaction of a vehicle spring, the combination of two relatively revolvable members, a friction member between said members and attached to one of them, a spring and a flexible member, said spring being connected to each of said first-mentioned members and tending to revolve one of them with relation to the other, one of said first-mentioned members being adapted for attachment to one of said elements and the other of said first-mentioned members being attached to said flexible member, said flexible member being adapted for attachment to said other element, the parts being so formed and associated as to cause a decrease in the force required to relatively revolve said two first-mentioned members as they are relatively revolved by said flexible member.

51. In mechanism for controlling, with decreasing resistance, relative movement between two elements in one direction, the combination of two relatively revolvable members, a friction member between said members and held by one of them, a spring and a flexible member, said spring being connected to each of said first-mentioned members and tending to revolve one of them with relation to the other, one of said first-mentioned members being adapted for attachment to one of said elements, said flexible member being wrapped upon and attached to the other of said first-mentioned members and adapted for attachment to said other element, the parts being so formed and associated as to cause a decrease in the pressure between said relatively revolvable members and said friction member as the elements separate.

52. In mechanism for controlling, with decreasing resistance, relative movement between two elements in one direction, the combination of two relatively revolvable members, a friction member between said members, a spring and a flexible member, said spring being connected to each of said first-mentioned members and tending to revolve one of them with relation to the other, one of said first-mentioned members being adapted for attachment to one of said elements, said flexible member being wrapped upon and attached to the other of said first-mentioned members and adapted for attachment to said other element, the parts being so formed and associated as to cause a decrease in the pressure between said relatively revolvable members and said friction member as the elements separate.

53. In mechanism for controlling relative movement between two elements, the combination of two curved frictionally opposed members, and a spring connecting said members, said spring when assembled in the mechanism being circumferentially held in a partially compressed state before receiving its operating adjustment the functional axis of said spring coinciding with a straight line penetrating within the curvature of one of said frictionally opposed members.

54. In mechanism for checking the too rapid separation of the sprung and unsprung portions of a vehicle, a cylindrical drum member adapted to be attached to one of said portions, a friction member adapted to be connected to said other portion, a spring connecting said two members and tending to revolve the friction member around the drum member in one direction, and means rotatable with one end of said spring to maintain said spring within predetermined circumferential limits regardless of the extent to which said spring is wound up or unwound the functional axis of said spring-maintaining means coinciding with a straight line penetrating within the circumference of said drum member.

55. In combination, a cylindrical drum member, a friction member in contact with said drum member, a metallic spring for relatively moving said friction member around said drum member, and means having a bearing on the drum portion of said drum member, for maintaining the outer end of said metallic spring out of contact with said drum portion.

56. In mechanism, the combination of two frictionally opposed members one of which is curved, a spring connected with one of said members, and an encircling retainer for said spring which is instrumental in transmitting the power of said spring to said other member, the functional axis of said retainer coinciding with a straight line penetrating within the curvature of said curved member.

57. In combination, two curved and frictionally opposed members, a spring connected with one of said curved members, a rigid member conforming with the circumference of said spring and connected thereto, said rigid member being connected with said other curved member, the functional axis of said rigid member coinciding with a straight line penetrating within the curvature of one of said curved members.

58. A rebound absorber comprising a non-rotating member adapted to be connected to one of two relatively movable parts and provided with a substantially cylindrical stationary braking surface; a resilient brake band member adapted to contact said braking surface; a flexible strap secured toward one end of said brake band and adapted to be connected to the other of the two relatively movable parts; and tensioning means tending to wrap the straps of the brake band toward the unconnected end and to draw it into frictional contact with the braking surface to resist separation of the said relatively movable parts and tending constantly to increase the amount of said frictional contact.

59. A device for controlling the rebound action following the forcing together of two spring-connected parts, comprising a drum shaped member adapted to be connected to one of said parts, a resilient brake band member in the form of an incomplete or split ring, adapted to frictionally engage said drum, spring means constantly tending to advance one end of said brake band around said drum, a flexible strap, one end of which is attached to the brake band toward said advance end, and the other end of which is adapted to be attached to the other of said spring-connected parts, the spring means thereby constantly tending to wrap the strap on the brake-band, drawing it into frictional engagement with the drum to resist the separation of said parts.

60. A device for controlling the rebound action following the forcing together of two spring-connected parts, comprising a drum-shaped member adapted to be connected to one of said parts, a resilient brake band member in the form of an incomplete ring adapted to frictionally engage said drum, a spring-actuated member connected to said brake band toward one end thereof and constantly tending to advance the attached end around said drum, a flexible strap, one end of which is adapted to be attached to the other of said spring-connected parts, and the other end of which is connected with said spring-actuated member, the spring-actuated member thereby constantly tending to wrap the strap on the brake band drawing it into frictional engagement with the drum to resist separation of said parts.

61. A rebound absorber for vehicles comprising a non-rotating member provided with a substantially cylindrical braking surface; a member journaled concentric with said braking surface; a flexible strap secured to the rotatable member and adapted to be wrapped round the cylindrical braking surface; and spring means tending to rotate one member on the other to wrap the strap on the cylindrical braking surface and tending constantly to increase the active braking surface; and a flexible brake band interposed between the flexible strap and the cylindrical braking surface and secured to the same member as the flexible strap.

62. A rebound absorber constructed as set forth in claim 61 provided with a resilient band supporting the flexible brake band in substantially concentric relation to the drum.

In witness whereof, I have hereunto set my hand this 6th day of August, A. D. 1919.

JOHN WARREN WATSON.